United States Patent
Yang

(10) Patent No.: US 8,920,007 B2
(45) Date of Patent: Dec. 30, 2014

(54) VEHICLE LIGHTING DEVICE

(75) Inventor: Hsiu-Pen Yang, New Taipei (TW)

(73) Assignee: Sonar Auto Parts Co., Ltd., New Taipei (TW)

( * ) Notice: Subject to any disclaimer, the term of this patent is extended or adjusted under 35 U.S.C. 154(b) by 559 days.

(21) Appl. No.: 13/225,606

(22) Filed: Sep. 6, 2011

(65) Prior Publication Data

US 2013/0058112 A1 Mar. 7, 2013

(51) Int. Cl.
  *F21V 9/00* (2006.01)
  *F21S 8/10* (2006.01)
  *B60Q 1/00* (2006.01)

(52) U.S. Cl.
  CPC ......... *F21S 48/2281* (2013.01); *F21S 48/2243* (2013.01); *B60Q 1/0052* (2013.01); *B60Q 1/0047* (2013.01); *F21S 48/2262* (2013.01); *B60Q 2400/30* (2013.01); *F21S 48/225* (2013.01)

USPC .......................................................... 362/511

(58) Field of Classification Search
  USPC .......................................................... 362/511
  See application file for complete search history.

(56) References Cited

U.S. PATENT DOCUMENTS

| 6,619,829 | B1 * | 9/2003 | Chen | 362/544 |
| 7,086,765 | B2 * | 8/2006 | Wehner | 362/511 |
| 2006/0268563 | A1 * | 11/2006 | Yang | 362/509 |

* cited by examiner

*Primary Examiner* — Sean Gramling
(74) *Attorney, Agent, or Firm* — Rosenberg, Klein & Lee

(57) ABSTRACT

A light-guiding member closed to a car light has an atomized light-guiding body, wherein a containing space is formed inside and connected to a light inlet correspondingly. Differently as the traditional way, light-guiding member in the car illumination assembly set the LED cluster inside to function the daytime running light raise the uniform brightness of the daytime running light which have both the daytime running effect and the whole style.

6 Claims, 6 Drawing Sheets

US 8,920,007 B2

VEHICLE LIGHTING DEVICE

BACKGROUND OF THE INVENTION

1. Field of the Invention

The instant disclosure relates to a light-guiding apparatus; more particularly; to the light-guiding apparatus capable of generating uniform light output that is adaptable in a car illumination assembly light-guiding member.

2. Description of Related Art

The daytime running light has been widely adapted on motor vehicles in Europe. The daytime running light increases the observability of a vehicle, and thus helps to reduce traffic accident rate. By the statistics, turning on the light in driving not only reduce 12.4% of the traffic accident rate but also reduce 24.6% of the traffic death rate so that the light make the traffic accident rate less and less.

Various types of daytime running light have been produced, for example, the daytime running light shown in FIG. 1 was often used in a conventional car lamp assembly Z', which utilizes a pair of circular ring-shaped daytime running light covers A' to house a plurality of light bulbs (or the light emitting devices) arranged around the car light b'. However, the light bulb (or the light emitting devices) was one kind of point source-light so that it produces high light intensity near but reduces far away. In order to uniformize the brightness, a reflector was set in front of the daytime running light for increasing the reflection frequency but limited the whole style of car illumination assembly Z' or reduced the daytime running effect.

SUMMARY OF THE INVENTION

The instant disclosure provides a light-guiding member and a car illumination assembly to raise the uniform brightness of the daytime running light which have both the daytime running effect and the whole style.

The instant disclosure provides a light-guiding member which is closed to a car light having an atomized light-guiding body, wherein a containing space is formed inside and connected to a light inlet correspondingly.

The instant disclosure also provides another car illumination assembly comprising a car light assembly having at last one car light, a lamp bezel unit arranged in front of the car light has at last one car light hole corresponding to each of the car light, at last one light-guiding member arranged in front of the bezel unit proximate the car light has an atomized light-guiding body, wherein a containing space is formed inside and connected to a light inlet correspondingly, at last one LED cluster having several LED units which are formed in each of the light inlet and a lampshade covering on the car light assembly to form thereon, wherein all the light-guiding members and the LED cluster are in the enclosed space.

The instant disclosure has the following advantage. Light-guiding member in the car illumination assembly set the LED cluster inside to function the daytime running light is different from the traditional way: a reflector in front of the daytime running light used for increasing the reflection frequency limited the whole style of car illumination assembly or reduced the daytime running effect.

In order to further appreciate the characteristics and technical contents of the instant disclosure, references are hereunder made to the detailed descriptions and appended drawings in connection with the instant disclosure. However, the appended drawings are merely shown for exemplary purposes, rather than being used to restrict the scope of the instant disclosure.

DETAILED DESCRIPTION OF PREFERRED EMBODIMENTS

Figure 1:
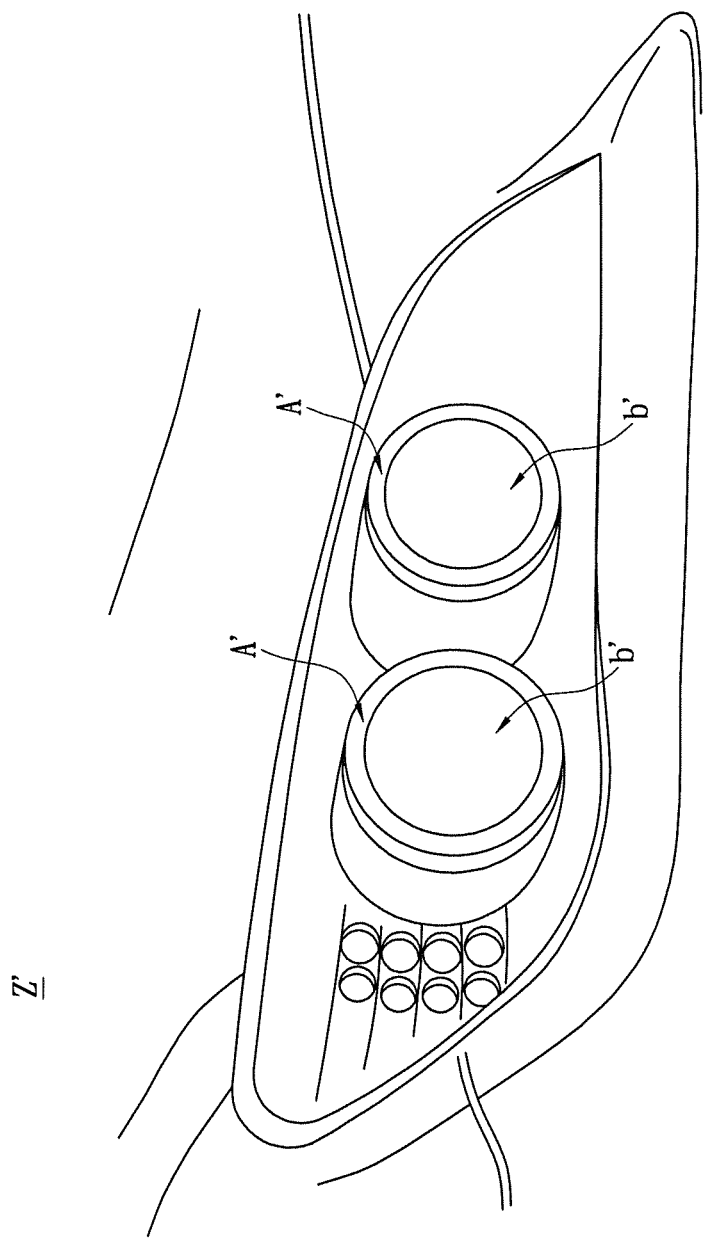
FIG. 1 is a schematic view of the prior car illumination assembly with ring-shaped daytime running light.
Figure 2:
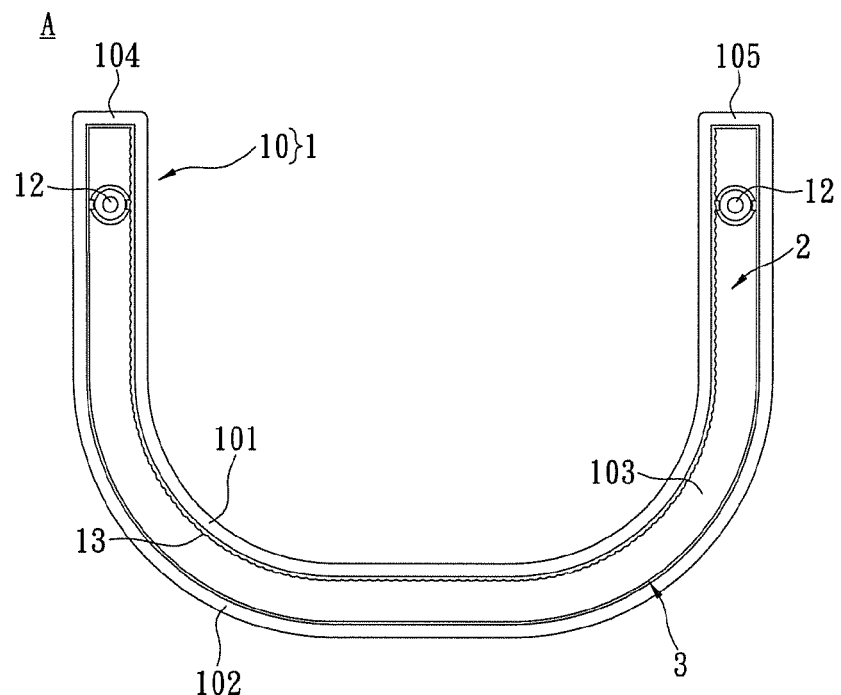
FIG. 2 is the front view of the U-type light-guiding unit for the instant disclosure.
Figure 3:
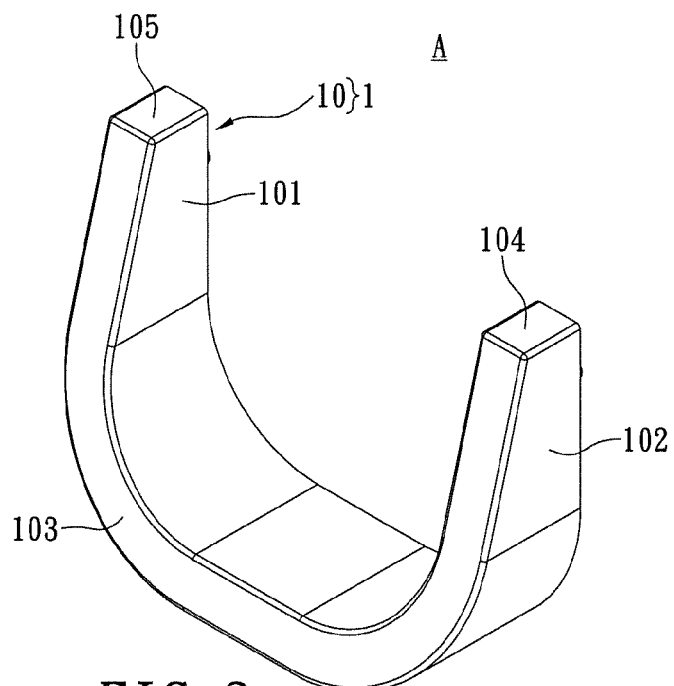
FIG. 3 is an isolate view of the U-type light-guiding unit for the instant disclosure.
Figure 4:
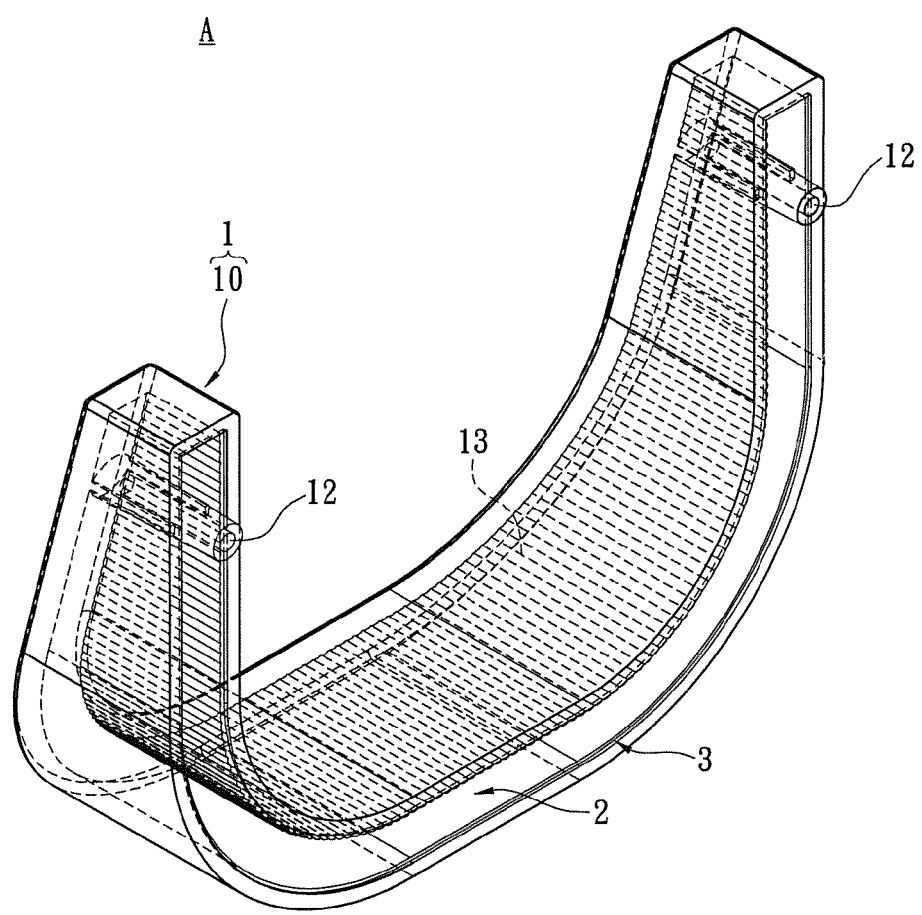
FIG. 4 is another isolate view of the U-type light-guiding unit for the instant disclosure.

Please refer to FIG. 2~4, which show a light-guiding member A closed to a car light b for a first embodiment of the instant disclosure. The light-guiding member A has an atomized light-guiding body 1, wherein a containing space 2 is formed inside and connected to a light inlet 3 correspondingly.

The atomized light-guiding body 1 in the instant exemplary embodiment is a U-type light-guiding unit 10 made with light permissive material such that the light will be tone down and have a more uniform brightness after passing the U-type light-guiding unit 10.

There are three features on the appearance of the U-type light-guiding unit 10: A first U-type shell 101. A second U-type shell 102 setting outside the first U-type shell 101. There is a slit area between the first U-type shell 101 and the second U-type shell 102 such that a U-type plate 103 formed on the slit area and connected the first U-type shell 101 and the second U-type shell 102. Furthermore, a first end plate 104 connected with the end of the first U-type shell 101, the end of the second U-type shell 102, and the end of the U-type plate 103; a second end plate 105 connected with the other end of the first U-type shell 101, the other end of the second U-type shell 102, and the other end of the U-type plate 103.

There is a feature on the appearance of the atomized light-guiding structure 1: a corrugated micro-structure 13 formed on the first U-type shell 101 used for promoting refraction and reflection of light as it passes through the light-guiding member. By this arrangement, the local light intensity may be more evenly distributed toward the frontal U-type plate 103.

Figure 5:
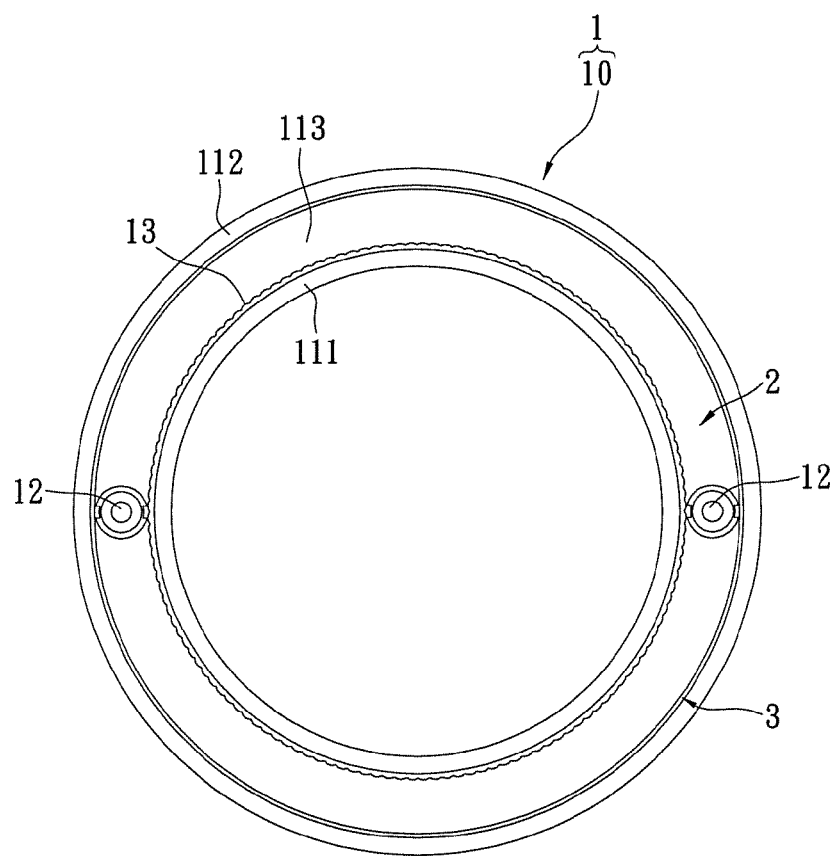
FIG. 5 is the front view of the O-type light-guiding unit for the instant disclosure.

Please refer to FIG. 5, which show a light-guiding member A closed to a car light b for a second embodiment of the instant disclosure. The light-guiding member A has an atomized light-guiding body 1, wherein a containing space 2 is formed inside and connected to a light inlet 3 correspondingly.

The atomized light-guiding body 1 in the instant exemplary embodiment is a O-type light-guiding unit 11 made with light permissive material such that the light will be tone down and have a more uniform brightness after passing the O-type light-guiding unit 11.

There are three features on the appearance of the O-type light-guiding unit 11: A first O-type shell 111. A second O-type shell 112 setting outside the first O-type shell 111.

There is a slit area between the first O-type shell 111 and the second O-type shell 112 such that a O-type plate 113 formed on the slit area and connected the first O-type shell 111 and the second U-type shell 112.

There is a feature on the appearance of the atomized light-guiding structure 1: a corrugated micro-structure 13 formed on the first O-type shell 111 used for increasing the refraction and reflection frequency. By these increased frequency, the light intensity reduced after passing the first O-type shell 111 but raised after passing the O-type plate 113.

Please refer to FIGS. 2, 4~6, which show the light-guiding member is fixed to a car illumination assembly Z by two location parts 12 formed on the atomized light-guiding body 1. These two location parts 12 are only functioned to fix so that not limited by the number, the appearance, or the fixing method of the location part 12.

Figure 6:
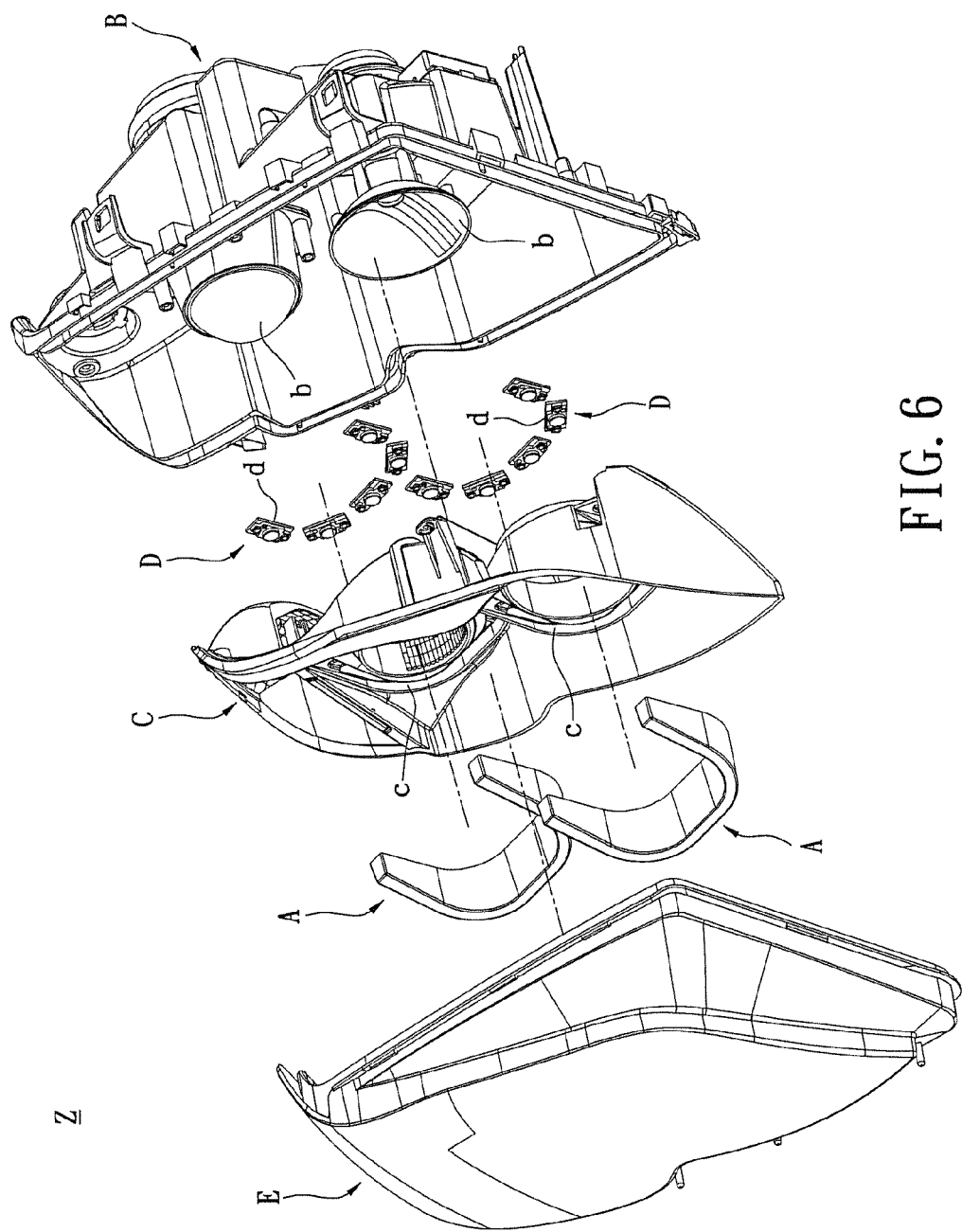
FIG. 6 is an exploded view of the car illumination assembly for the instant disclosure.
Figure 7:
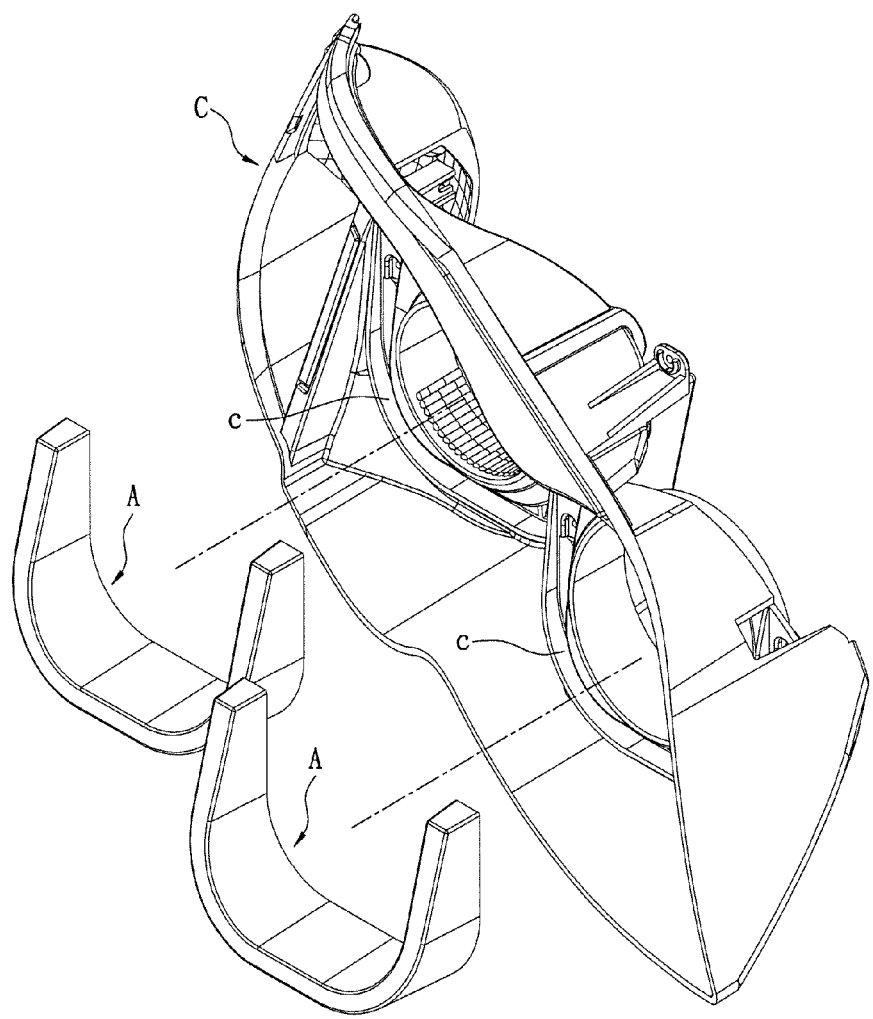
FIG. 7 is a local exploded view of the car illumination assembly for the instant disclosure.

Please refer to FIGS. 4, 6, 7, which show a car illumination assembly Z comprising a car light assembly B, a bezel C, at last one light-guiding member A, at last one LED cluster D, and a lampshade E.

The car light assembly B has at last one car light b which comprises a light source and a reflector, the bezel C which is formed in front of the car light b has at last one car light hole corresponding to each of the car light b. Each car light-guiding structure A is an U-type light-guiding unit 10 shown as above. Each light inlet 3 of the car light-guiding structure A closed to each the concave trough c of the bezel C correspondingly. Each first U-type shell 101 closed to each the car light b. The car light-guiding structure A was fixed on the bezel C by two location part 12. The LED cluster D shown above has a plurality of the LED unit d formed in the light inlet 3. Each of the LED unit d which was fixed on each convergence structure in the concave trough produced a better convergence effect by the reflect surface and each the convergence structure. The lampshade E covering on the car light assembly B formed thereon, wherein the light-guiding members A, bezel C and the LED cluster D are all in the enclosed space.

Light-guiding member A in the car illumination assembly Z set the LED cluster D inside to function the daytime running light is different as the traditional way: a reflector in front of the daytime running light used for increasing the reflection frequency limited the whole style of car illumination assembly or reduced the daytime running effect.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A vehicle illumination assembly, comprising:
    a car light assembly having at least one car light;
    a bezel including a concave trough with inner surface defining a first containing space and a light exit port connecting to the first containing space, wherein the car light is assembled within the concave trough and is arranged toward to the light exit port;
    at least one light-guiding member arranged on the inner surface of the light exit port,
        wherein the light-guiding member includes an atomized light-guiding body including an inner shell, an outer shell and a front plate respectively connecting to edges of the inner and the outer shell, defining a light inlet thereon which permits access to a second containing space defined therein,
        wherein the light inlet is opened to connect to the second containing space and is opened toward the car light to receive light emitted from the car light,
        wherein the front plate is arranged outward of the bezel from the light exit port,
        wherein a corrugated micro-structure is formed on inner surface of the inner shell to assist raising light intensity passing through the front plate; and
    at least one LED unit, which are fixedly arranged toward the light inlet of the light-guiding member, to project additional light into the light guiding member.

2. The car illumination assembly of claim 1, wherein a reflective surface is formed on the concave trough.

3. The car illumination assembly of claim 1, wherein the atomized light guiding body is of U-shape configuration.

4. The car illumination assembly of claim 3, wherein the inner shell, outer shell and front plate are of U-shape.

5. The car illumination assembly of claim 1, wherein the atomized light guiding body is of O-shape configuration.

6. The car illumination assembly of claim 5, wherein the inner shell, the outer shell and the front plate are of O-shape.

\* \* \* \* \*